(12) United States Patent
Masuda et al.

(10) Patent No.: US 6,461,990 B1
(45) Date of Patent: Oct. 8, 2002

(54) CUBIC BORON NITRIDE COMPOSITE PARTICLE

(75) Inventors: Tomoyuki Masuda; Kousuke Shioi, both of Nagano (JP)

(73) Assignee: Showa Denko K.K., Tokyo (JP)

(*) Notice: Subject to any disclaimer, the term of this patent is extended or adjusted under 35 U.S.C. 154(b) by 12 days.

(21) Appl. No.: 09/606,542

(22) Filed: Jun. 30, 2000

Related U.S. Application Data

(60) Provisional application No. 60/164,339, filed on Nov. 9, 1999.

(30) Foreign Application Priority Data

Jun. 30, 1999 (JP) .......................................... 11-185260

(51) Int. Cl.$^7$ .................. C04B 35/5831; C04B 35/5835
(52) U.S. Cl. .......................... 501/96.4; 501/87; 501/92; 501/96.3; 501/97.4
(58) Field of Search .......................... 501/87, 92, 96.3, 501/96.4, 97.4

(56) References Cited

U.S. PATENT DOCUMENTS

| | | | | |
|---|---|---|---|---|
| 5,106,792 A | * | 4/1992 | Corrigan | 501/96.4 |
| 5,898,009 A | * | 4/1999 | Shaffer et al. | 501/96.4 |
| 5,985,228 A | * | 11/1999 | Corrigan et al. | 501/96.4 |

* cited by examiner

*Primary Examiner*—Karl Group
(74) *Attorney, Agent, or Firm*—Sughrue Mion, PLLC

(57) ABSTRACT

Cubic boron nitride composite particles containing hard microparticles dispersed in cubic boron nitride particles. The hard microparticles have an average particle size of about 10 nm to about 10 μm and a particle size equal to or smaller than one-third of the particle size of any of the cubic boron nitride particles, and the amount of the hard microparticles dispersed in the cubic boron nitride particles is from about 1% to about 50% by volume.

15 Claims, 1 Drawing Sheet

CUBIC BORON NITRIDE COMPOSITE PARTICLE

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/164,339 filed Nov. 9, 1999 pursuant to 35 U.S.C. §111(b).

FIELD OF THE INVENTION

The present invention relates to cubic boron nitride composite particles, comprising microparticles, preferably hard microparticles, dispersed in cubic boron nitride particles.

BACKGROUND OF THE INVENTION

Cubic boron nitride is second only to diamond in hardness and has excellent chemical stability greater than that of diamond. Thus, there is increasing demand for cubic boron nitride materials for use in grinding, polishing and cutting. A variety of methods for producing cubic boron nitride have been developed, and the method which is best known and most often employed in industry includes maintaining hexagonal boron nitride under high-temperature, high-pressure conditions (approximately 5.5 GPa and 1600° C.) in the presence of a solvent (catalyst), to thereby transform hexagonal boron nitride to cubic boron nitride. Examples of well-known solvents (catalysts) include alkali metal nitrides, alkali metal boronitrides, alkaline earth metal nitrides and alkaline earth metal boronitrides. Particularly, $Li_3N$ and $Li_3BN_2$ have been confirmed to be effective catalysts (see, e.g., U.S. Pat. No. 3,772,428). Cubic boron nitride produced using such a solvent (catalyst) generally assumes the form of monocrystalline particles which do not contain heteromicroparticles, such as microparticles of heterospecies and cubic boron nitride microparticles having different crystallographic direction.

However, when the aforementioned monocrystalline cubic boron nitride particles are used in grinding or polishing, the particles may be subject to large-scale crushing to thereby lower the grinding ratio. Thus, formation of minute cutting edges may be insufficient, so as to disadvantageously increase the frequency of dressing.

SUMMARY OF THE INVENTION

It is therefore an object of the present invention to provide cubic boron nitride materials having enhanced grinding, polishing and cutting properties. The above objective has been achieved by providing:

(1) Cubic boron nitride composite particles comprising microparticles dispersed in cubic boron nitride particles;

(2) Cubic boron nitride composite particles according to (1), wherein the microparticles are dispersed in the cubic boron nitride particles in an amount of from about 1% to about 50% by volume;

(3) Cubic boron nitride composite particles according to (1) or (2), wherein the microparticles have an average particle size of about 10 nm to about 10 μm and a particle size equal to or smaller than one-third the particle size of the cubic boron nitride particles;

(4) Cubic boron nitride composite particles according to (1) or (2), wherein the microparticles comprise hard microparticles; and (5) Cubic boron nitride composite particles according to (3), wherein the microparticles comprise hard microparticles.

The reason why the cubic boron nitride composite particles of the present invention exhibit excellent performance has not been fully elucidated. However, possible reasons as to why the particles are not subject to large-scale crushing are as follows. Specifically, propagation of cracking is prevented or the direction of cracking propagation is changed by the microparticles, to thereby modify the energy for breaking; and residual stress is generated around microparticles, to thereby absorb energy for breaking. It is considered that the generation of minute cutting edges is promoted because microparticles exposed on the particle surface serve as break-initiating points, to thereby generate microcracks corresponding to the distance between microparticles.

As used herein, the term "particles" means "grains" or "crystalline particles".

DESCRIPTION OF THE PREFERRED EMBODIMENTS

Figure 1:
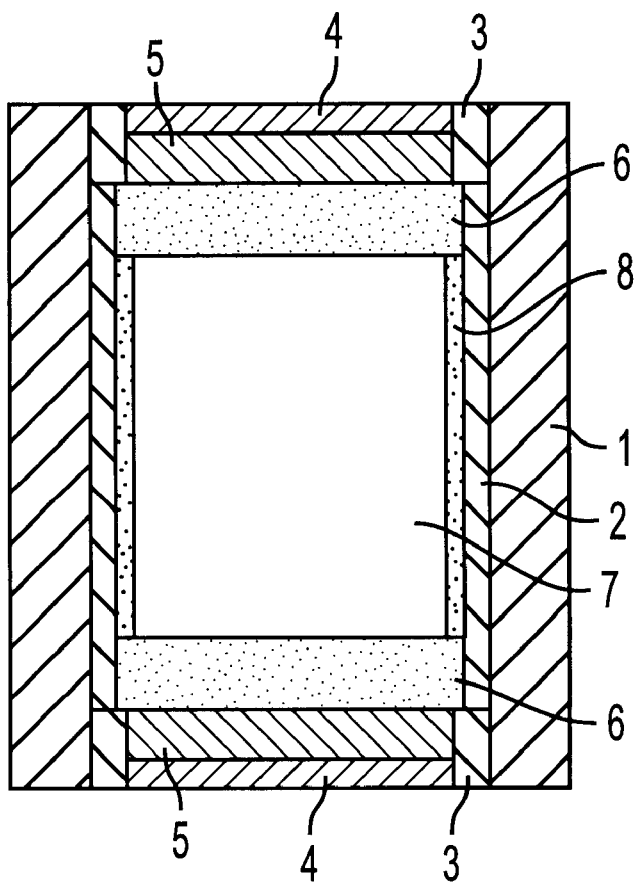
FIG. 1 is a cross-sectional view of a reactor for transforming hexagonal boron nitride into cubic boron nitride as used in the Example below.

The microparticles of the present invention preferably have an average particle size of about 10 nm to about 10 μm, more preferably about 50 nm to about 1 μm. Furthermore, the microparticles have an absolute particle size equal to or smaller than one-third the particle size of the cubic boron nitride particles. When the particle size of the microparticles is smaller than 10 nm, the microparticles exhibit insufficient effects and minute cutting edges are insufficiently generated in abrasive particles for grinding or polishing by use of the microparticles. In contrast, when the particle size is in excess of 10 μm, the composite particles may be subjected to large-scale crushing. The cubic boron nitride composite particles have a particle size of about 0.05 μm to about 1 mm, and the ratio of the particle size of the microparticles to that of the cubic boron nitride particles is preferably ⅓ or less. When the ratio is less than one millionth, the microparticles exhibit insufficient effects and minute cutting edges are insufficiently generated in abrasive particles for grinding or polishing by use of the microparticles. In contrast, when the ratio is in excess of ⅓, the composite particles may be subject to large-scale crushing. Furthermore, the amount of the hard microparticles contained in the cubic boron nitride particles is preferably from about 1% to about 50% by volume, more preferably from about 5% to about 30% by volume. When the amount is less than about 1% by volume, the microparticles exhibit insufficient effects and minute cutting edges are insufficiently generated in abrasive particles for grinding or polishing by use of the microparticles. In contrast, when the amount is in excess of about 50% by volume, the composite particles may be subjected to large-scale crushing.

The microparticles for use in the present invention are preferably hard microparticles, preferably having a Knoop hardness value of more than 1000 kgf/mm², comprising one or more materials selected from borides, silicides, carbides, nitrides, and carbonitrides of Ti, Zr, Hf, V, Nb, Ta, Cr, Mo, or W; borides, silicides, carbides, nitrides, and carbonitrides of Y or lanthanide-series rare earth elements; cubic boron nitride; diamond; SiC; $ZrO_2$; $Al_2O_3$; $Si_3N_4$; AlN; MgO; $CaB_6$; and similar materials. In addition, compounds thereof such as solid solutions, complex compounds, and non-stoichiometric compounds may also provide similar hard microparticles. The effects of the present invention are also provided by these microparticles produced under high-temperature, high-pressure conditions. The cubic boron nitride composite particles of the present invention can be produced by maintaining a raw material comprising hexagonal boron nitride, a solvent (catalyst), and hard microparticles of a suitable average diameter under high-temperature, high-pressure conditions, to thereby incorporate hard microparticles into cubic boron nitride particles during growth of cubic boron nitride.

Commercially available hexagonal boron nitride powder may be used as the hexagonal boron nitride serving as a starting material. The amount of oxygen in the raw material is preferably small, since the oxygen impurity mingled in the form of boron oxide or like materials may retard transformation from hexagonal boron nitride to cubic boron nitride. No particular limitation is imposed on the particle size of hexagonal boron nitride. Typically, a size of about 150 mesh or less is preferred, since an excessively large particle size may lower reactivity with a solvent (catalyst). Alternatively, boron nitride material such as sintered hexagonal boron nitride or a plate of pyrolytic hexagonal boron nitride may also be used.

Similar to the case of hexagonal boron nitride serving as a raw material, the amount of an oxygen impurity in the solvent (catalyst) is preferably small. No particular limitation is imposed on the particle size of the solvent (catalyst). Typically, a size of about 150 mesh or less is preferred, since an excessively large particle size may lower reactivity with hexagonal boron nitride.

In the present invention, a known solvent (catalyst) for producing cubic boron nitride may be used. Examples of known solvents (catalysts) for producing cubic boron nitride include metal elements such as an alkali metal, an alkaline earth metal, yttrium, a lanthanide-series rare earth metal element, tin, lead, zinc, antimony, aluminum, silicon and cadmium; alloys thereof; nitrides thereof; boronitrides thereof; amides thereof; imides thereof; and organic compounds thereof. The amount of the aforementioned solvent (catalyst) to be added is preferably 2 parts or more by the number of atoms of the metal elements contained in the solvent (catalyst), preferably 5–50 parts, based on 100 parts by the number of molecules of hexagonal boron nitride. When the amount of the solvent (catalyst) is less than 2 parts, conversion to cubic boron nitride is poor, and when the amount is less than 5 parts, a long period of time is required to attain high conversion. In contrast, when the amount is in excess of 50 parts, conversion does not exceed a certain value, to make the conversion economically disadvantageous. Both cases are considered disadvantageous.

The amount of hard microparticles added to a raw material varies in accordance with conversion; the target amount of the hard microparticles; the method used for adding the hard microparticles; and other factors. Typically, the volume of cubic boron nitride transformed from hexagonal boron nitride contained in a raw material is estimated in advance. If the volume is 100 parts, 2–80 parts by volume of hard microparticles are preferably added so as to be incorporated in an amount of from about 1% to about 50% by volume. Since hard microparticles which are not incorporated into cubic boron nitride remain in a bulk of the product, hard microparticles are added to a raw material in an amount greater than the desired content.

In one embodiment, powders of the aforementioned hexagonal boron nitride, solvent (catalyst), and hard microparticles are preferably mixed to thereby become combined. Alternatively, hexagonal boron nitride layers containing hard microparticles and solvent (catalyst) layers may be laminated alternately in a reactor. In practice, a preferable method includes mixing hexagonal boron nitride, a solvent (catalyst), and hard microparticles; shaping the mixture at pressure of approximately 1–2 ton/cm$^2$; and placing the compact into a reactor. This is because ease of handling of the raw material powder is enhanced and shrinkage of the compact in the reactor decreases, to thereby enhance productivity. In order to effectively incorporate hard microparticles into cubic boron nitride particles, a predetermined portion of hard microparticles is preferably dispersed in advance into a solvent (catalyst).

Alternatively, microparticles of cubic boron nitride may be added as seed crystals to the aforementioned compact or laminate in advance, to thereby promote crystal growth of cubic boron nitride. In this case, the seed crystals may be coated with a solvent (catalyst) comprising hard microparticles.

The aforementioned compact or a similar material is placed in a reactor, which is then inserted in a known high-temperature, high-pressure apparatus, to thereby maintain the material under temperature and pressure conditions where cubic boron nitride is stable. These conditions are described in *J. Chem. Phys.*, 38 (5), 1144–1149 (1963) by F. P. Bundy and R. H. Wentorf.

The maintenance time is not particularly limited, and maintenance under high-temperature and high-pressure conditions continues until the target transformation ratio is attained. Typically, the time is one second to six hours.

Hexagonal boron nitride is transformed into cubic boron nitride by maintaining the compact or similar material under the aforementioned conditions. If temperature and pressure are extremely high, transformation may approach 100%. However, co-existing hexagonal boron nitride and cubic boron nitride composite particles can be isolated and purified. A method described in Japanese Patent Publication (kokoku) No. 49–27757 may be employed as an isolation-purification method. Specifically, a produced bulk is crushed to particles having a particle size of 5 mm or less. Then, sodium hydroxide and a small amount of water are added to the crushed product and the mixture is heated to about 300° C., to thereby selectively dissolve hexagonal boron nitride. The resultant mixture is cooled, washed with acid, and filtered, and the residue is washed with acid and filtered, to thereby yield cubic boron nitride.

EXAMPLES

The present invention will now be explained in further detail by reference to the following Examples, however, the present invention should not be construed as being limited thereto.

A variety of solvents (catalysts) in which a predetermined amount of hard microparticles were dispersed were prepared, and each solvent (catalyst) was added to hexagonal boron nitride containing oxygen (0.8 wt.%) as an impurity and a metallic impurity (0.2 wt.%) other than an alkali metal or alkaline earth metal. The amount of each solvent (catalyst) was 20 parts by number of atoms of the metal elements contained in the solvent (catalyst) based on 100 parts by number of molecules of hexagonal boron nitride. In the Comparative Examples, each of the solvents (catalysts) shown in Table 3 and containing no hard microparticles was added, in a manner similar to that of the Examples of the invention, in an amount of 20 parts by number of atoms of the metal elements contained in the solvent (catalyst) based on 100 parts by number of molecules of hexagonal boron nitride. The amount of microparticles shown in Tables 1 to 3 refers to the number of molecules of hard microparticles based on 100 parts by number of molecules of hexagonal boron nitride. Each raw material mixture was shaped into a compact having dimensions of 26 mmφ×32 mmh under an applied pressure of 1.5 ton/cm$^2$ and placed in the reactor of FIG. 1. In the reactor of FIG. 1, an outer wall 1 of the reactor serving as a pressure-transmitter is made of pyrophyllite and has the shape of a hollow cylinder. A heater 2 made of a graphite hollow cylinder and a separator 8 made of pyrophyllite are disposed inside the outer wall. In each of the top and bottom ends of the reactor are disposed a steel ring 3 and a steel plate 4 for application of current. A sintered alumina plate 5 and a pyrophyllite pressure-transmitter 6 are disposed on the inner surfaces of each steel ring and each steel plate. A space defined by the pyrophyllite pressure-transmitters 6 and a pyrophillite separator 8 serves as a chamber 7 for holding a sample.

The aforementioned compact placed in the reactor was treated for 10 minutes under the conditions shown in Tables 1 to 3, to thereby produce a bulk. Cubic boron nitride composite particles were isolated and purified following the method described in Japanese Patent Publication (kokoku) No. 49-27757. A portion of the thus-isolated and purified cubic boron nitride composite particles was crushed in a mortar, and component phases were identified by means of an X-ray powder diffractometer. The results show that all samples produced in the Examples of the invention had exclusively a cubic boron nitride phase and a hard microparticle phase.

Furthermore, cross-sections of cubic boron nitride composite particles produced by adding cubic boron nitride and diamond as hard microparticles were mirror-polished and etched at 530° C. in air for two minutes using a NaOH melt. The volume ratio of hard microparticles contained in cubic boron nitride particles was estimated by observing the etched surfaces. When the samples were produced by adding hard microparticles other than cubic boron nitride or diamond, cross-sections of cubic boron nitride composite particles were mirror-polished and observed under an electron-microanalyzer (EPMA) or an electron microscope (SEM). The volume ratio and particle size of hard microparticles contained in cubic boron nitride composite particles were estimated by observing the surfaces.

By using the thus-produced cubic boron nitride composite particles, a vitrified bond grinding wheel was produced, and the performance of the grinding particles of the grinding wheel was evaluated. The composition and dimensions of the grinding wheel were as follows.

Particle size (grit size of cubic boron nitride composite particles):

170/200—range of grit size passing through between 170 mesh and 200 mesh Concentration: 100 (grinding particle ratio 25 vol%), corresponding to 4.4 carat of grinding particles/1cc of grinding wheel Porosity: 30 vol%

Bond ratio: 25 vol%

Filler: White alundum (WA #220) . . . 20%

Dimensions of grinding wheel: 205 mmφ, 5 mmU, 76.2 H

Cubic boron nitride composite particles were mixed with borosilicate glass and a filler, and the resultant mixture was shaped into a compact having dimensions of approximately 5 mm×3 mm×30 mm. The compact was fired at 900° C. in air for 12 hours. The sintered compact was bonded to an aluminum wheel, to thereby produce a grinding wheel. Grinding conditions were as follows: wet surface traverse grinding; peripheral velocity of grinding wheel of 2100 m/minute; table velocity of 15 m/minute; cross rail feed of 2 mm/path; and depth of cut of 20 μm. SKH-51 (JIS G 4403 (1983)—high speed tool steel) was employed as a workpiece. A grinding test of cubic boron nitride composite particles was carried out using a surface grinding machine under the aforementioned conditions, and the grinding ratio (grinding amount/wear amount of grinding wheel) and working power (W) were measured.

TABLE 1

| No. | Solvent Material | Microparticles | | | Volume ratio of microparticles (vol %) | Production conditions | Grinding ratio | Power (W) |
| --- | --- | --- | --- | --- | --- | --- | --- | --- |
| | | Material | Particle size (μm) | Amount | | | | |
| Ex. 1 | Li$_3$BN$_2$ | TiN | 3 | 7 | 11 | 5.5 GPa-1500° C. | 673 | 472 |
| Ex. 2 | Li$_3$BN$_2$ | TiN | 3 | 14 | 18 | 5.5 GPa-1500° C. | 601 | 514 |
| Ex. 3 | Ca$_3$B$_2$N$_4$ | TiN | 3 | 7 | 10 | 5.5 GPa-1500° C. | 658 | 483 |
| Ex. 4 | LiNH$_2$ | TiN | 3 | 7 | 10 | 4.5 GPa-1400° C. | 581 | 427 |
| Ex. 5 | Li$_3$BN$_2$ | AlN | 3 | 7 | 11 | 5.5 GPa-1500° C. | 651 | 479 |
| Ex. 6 | Li$_3$BN$_2$ | cBN | 3 | 7 | 9 | 5.5 GPa-1500° C. | 761 | 418 |
| Ex. 7 | LiNH$_2$ | cBN | 3 | 7 | 9 | 4.5 GPa-1400° C. | 683 | 415 |
| Ex. 8 | LiNH$_2$ | cBN | 3 | 4 | 6 | 4.5 GPa-1400° C. | 415 | 452 |
| Ex. 9 | LiNH$_2$ | cBN | 3 | 14 | 18 | 4.5 GPa-1400° C. | 605 | 433 |
| Ex. 10 | Li$_3$BN$_2$ | ZrN | 3 | 7 | 10 | 5.5 GPa-1500° C. | 631 | 507 |
| Ex. 11 | Li$_3$BN$_2$ | HfN | 3 | 7 | 11 | 5.5 GPa-1500° C. | 648 | 496 |
| Ex. 12 | Li$_3$BN$_2$ | Si$_3$N$_4$ | 3 | 7 | 11 | 5.5 GPa-1500° C. | 613 | 501 |
| Ex. 13 | Li$_3$BN$_2$ | TiB$_2$ | 3 | 7 | 10 | 5.5 GPa-1500° C. | 681 | 485 |

Note: cBN — cubic boron nitride

TABLE 2

| No. | Solvent Material | Microparticles Material | Particle size (μm) | Amount | Volume ratio of microparticles (vol %) | Production conditions | Grinding ratio | Power (W) |
|---|---|---|---|---|---|---|---|---|
| Ex. 14 | $Ca_3B_2N_4$ | $TiB_2$ | 3 | 7 | 10 | 5.5 GPa-1500° C. | 664 | 490 |
| Ex. 15 | $Li_3BN_2$ | $ZrB_2$ | 3 | 7 | 10 | 5.5 GPa-1500° C. | 651 | 494 |
| Ex. 16 | $Li_3BN_2$ | TiC | 3 | 7 | 9 | 5.5 GPa-1500° C. | 687 | 428 |
| Ex. 17 | $Li_3BN_2$ | WC | 3 | 7 | 8 | 5.5 GPa-1500° C. | 702 | 420 |
| Ex. 18 | $Li_3BN_2$ | WC | 3 | 4 | 5 | 5.5 GPa-1500° C. | 558 | 541 |
| Ex. 19 | $Li_3BN_2$ | WC | 3 | 14 | 19 | 5.5 GPa-1500° C. | 616 | 499 |
| Ex. 20 | $Li_3BN_2$ | HfC | 3 | 7 | 9 | 5.5 GPa-1500° C. | 635 | 505 |
| Ex. 21 | $Li_3BN_2$ | ZrC | 3 | 7 | 10 | 5.5 GPa-1500° C. | 652 | 486 |
| Ex. 22 | $Li_3BN_2$ | SiC | 3 | 7 | 10 | 5.5 GPa-1500° C. | 613 | 511 |
| Ex. 23 | $Li_3BN_2$ | diamond | 3 | 7 | 9 | 5.5 GPa-1500° C. | 820 | 405 |
| Ex. 24 | $LiNH_2$ | diamond | 3 | 7 | 9 | 4.5 GPa-1400° C. | 735 | 420 |
| Ex. 25 | $LiNH_2$ | diamond | 3 | 4 | 9 | 4.5 GPa-1400° C. | 584 | 453 |
| Ex. 26 | $LiNH_2$ | diamond | 3 | 14 | 18 | 4.5 GPa-1400° C. | 681 | 433 |

TABLE 3

| No. | Solvent Material | Microparticles Material | Particle size (μm) | Amount | Volume ratio of microparticles (vol %) | Production conditions | Grinding ratio | Power (W) |
|---|---|---|---|---|---|---|---|---|
| Ex. 27 | $Li_3BN_2$ | TiN | 0.1 | 7 | 10 | 5.5 GPa-1500° C. | 613 | 495 |
| Ex. 28 | $Li_3BN_2$ | TiN | 0.01 | 7 | 10 | 5.5 GPa-1500° C. | 633 | 501 |
| Ex. 29 | $Li_3BN_2$ | MgO | 3 | 7 | 9 | 5.5 GPa-1500° C. | 629 | 481 |
| Ex. 30 | $Li_3BN_2$ | $Al_2O_3$ | 3 | 7 | 9 | 5.5 GPa-1500° C. | 622 | 485 |
| Ex. 31 | $Li_3BN_2$ | $YB_6$ | 3 | 7 | 11 | 5.5 GPa-1500° C. | 631 | 501 |
| Ex. 32 | $Li_3BN_2$ | $SmB_6$ | 3 | 7 | 10 | 5.5 GPa-1500° C. | 597 | 482 |
| Ex. 33 | $Li_3BN_2$ | $SmB_4$ | 3 | 7 | 11 | 5.5 GPa-1500° C. | 602 | 510 |
| Ex. 34 | $Li_3BN_2$ | $ErB_6$ | 3 | 7 | 9 | 5.5 GPa-1500° C. | 611 | 490 |
| Ex. 35 | $Li_3BN_2$ | $YbB_6$ | 3 | 7 | 10 | 5.5 GPa-1500° C. | 612 | 482 |
| Comp. Ex. 1 | $Li_3BN_2$ | — | — | — | — | 5.5 GPa-1500° C. | 431 | 562 |
| Comp. Ex. 2 | $Ca_3B_2N_4$ | — | — | — | — | 5.5 GPa-1500° C. | 433 | 593 |
| Comp. Ex. 3 | $LiNH_2$ | — | — | — | — | 5.5 GPa-1500° C. | 329 | 472 |

The present invention provides cubic boron nitride composite particles comprising hard microparticles dispersed in cubic boron nitride particles, the composite particles having excellent characteristics which conventionally have not been attained.

While the invention has been described in detail and with reference to specific embodiments thereof, it will be apparent to one skilled in the art that various changes and modifications can be made therein without departing from the spirit and scope thereof.

What is claimed is:

1. Cubic boron nitride composite particles having exclusively a cubic boron nitride phase formed from hexagonal boron nitride and a hard microparticle phase comprising microparticles dispersed in the cubic boron nitride phase, wherein the microparticles comprise a material selected from the group consisting of borides, silicides, carbides, nitrides, and carbonitrides of Ti, Zr, Hf, V, Nb, Ta, Cr, Mo, or W; borides, silicides, carbides, nitrides, and carbonitrides of Y or lanthanide-series rare earth elements; diamond; SiC; $ZrO_2$; $Al_2O_3$; $Si_3N_4$; AlN; MgO; and $CaB_6$.

2. Cubic boron nitride composite particles according to claim 1, wherein the microparticles are dispersed in the cubic boron nitride composite particles in an amount of from about 1% to about 50% by volume.

3. Cubic boron nitride composite particles according to claim 1, wherein the microparticles have an average particle size of about 10 nm to about 10 μm and a particle size equal to or smaller than one-third the particle size of the cubic boron nitride composite particles.

4. Cubic boron nitride composite particles according to claim 2, wherein the microparticles have an average particle size of about 10 nm to about 10 μm and a particle size equal to or smaller than one-third the particle size of the cubic boron nitride composite particles.

5. Cubic boron nitride composite particles according to claim 1, wherein the microparticles comprise hard microparticles.

6. Cubic boron nitride composite particles according to claim 2, wherein the microparticles comprise hard microparticles.

7. Cubic boron nitride composite particles according to claim 3, wherein the microparticles comprise hard microparticles.

8. Cubic boron nitride composite particles according to claim 4, wherein the microparticles comprise hard microparticles.

9. Cubic boron nitride composite particles according to claim 1, wherein the cubic boron nitride composite particles have a particle size of about 0.05 μm to about 1 mm.

10. Cubic boron nitride composite particles having exclusively a cubic boron nitride phase formed from hexagonal boron nitride and a hard microparticle phase comprising microparticles dispersed in the cubic boron nitride phase, wherein the microparticles comprise a material selected from the group consisting of borides, silicides, carbides, nitrides, and carbonitrides of Ti, Zr, Hf, V, Nb, Ta, Cr, Mo, or W; borides, silicides, carbides, nitrides, and carbonitrides of Y or lanthanide-series rare earth elements; diamond; SiC; $ZrO_2$; $Al_2O_3$; $Si_3N_4$; AlN; MgO; and $CaB_6$, prepared by a process which comprises mixing powders of hexagonal boron nitride, a solvent and microparticles, shaping the mixture under pressure to form a compact, and treating the compact under conditions of temperature and pressure such that at least a portion of the hexagonal boron nitride is converted to cubic boron nitride.

11. Cubic boron nitride composite particles according to claim wherein the microparticles are dispersed in the cubic boron nitride composite particles in an amount from about 1% to about 50% by volume.

12. Cubic boron nitride composite particles according to claim wherein the microparticles have an average particle size of about 10 nm to about 10 $\mu$m and a particle size equal to or smaller than one-third the particle size of the cubic boron nitride composite particles.

13. Cubic boron nitride composite particles having exclusively a cubic boron nitride phase formed from hexagonal boron nitride and a hard microparticle phase comprising microparticles dispersed in the cubic boron nitride phase, wherein the microparticles comprise a material selected from the group consisting of borides, suicides, carbides, nitrides, and carbonitrides of Ti, Zr, Hf, V, Nb, Ta, Cr, Mo, or W; borides, silicides, carbides, nitrides, and carbonitrides of Y or lanthanide-series rare earth elements; diamond; SiC; $ZrO_2$; $Al_2O_3$; $Si_3N_4$; AlN; MgO; and $CaB_6$, prepared by heating under pressure a raw material comprising hexagonal boron nitride and microparticles in the presence of a solvent such that at least a portion of the hexagonal boron nitride is converted to cubic boron nitride.

14. Cubic boron nitride composite particles according to claim 13, wherein the microparticles are dispersed in the cubic boron nitride composite particles in an amount of from about 1% to about 50% by volume.

15. Cubic boron nitride composite particles according to claim 13, wherein the microparticles have an average particle size of about 10 nm to about 10 $\mu$m and a particle size equal to or smaller than one-third the particle size of the cubic boron nitride composite particles.

* * * * *